United States Patent [19]

Hyndman et al.

[11] 3,990,492

[45] Nov. 9, 1976

[54] FLUID DISPENSING APPARATUS FOR TIRE WHEEL ASSEMBLY

[75] Inventors: John R. Hyndman, Atwater; Kenneth W. McIntosh, Cuyahoga Falls, both of Ohio

[73] Assignee: The Goodyear Tire & Rubber Company, Akron, Ohio

[22] Filed: Mar. 31, 1975

[21] Appl. No.: 563,602

[52] U.S. Cl. ............................ 152/158; 152/330 L
[51] Int. Cl.² .................... B60C 17/04; B60C 17/00
[58] Field of Search ...... 152/330 R, 330 RF, 330 L, 152/158

[56] References Cited
UNITED STATES PATENTS

| | | | |
|---|---|---|---|
| 3,850,217 | 11/1974 | Edwards et al. | 152/330 RF |
| 3,850,220 | 11/1974 | Mitchell | 152/330 L |
| 3,930,526 | 1/1976 | Edwards | 152/330 L |
| 3,931,843 | 1/1976 | Edwards et al. | 152/330 L |
| 3,942,573 | 3/1976 | Lawrence et al. | 152/330 L |

FOREIGN PATENTS OR APPLICATIONS 1,359,461   7/1974   United Kingdom .............. 152/330 L

*Primary Examiner*—Drayton E. Hoffman
*Attorney, Agent, or Firm*—F. W. Brunner; P. E. Milliken; Frederick K. Lacher

[57] ABSTRACT

Fluid dispensing apparatus for a tire wheel assembly having a wheel supported ring member with a diameter greater than the wheel rim diameter and less than the tire tread diameter. A fluid chamber is provided radially inward of the ring and an opening in the ring accommodates a passage leading from the fluid chamber to the radially outer surface of the ring. A closure for the passage extends radially outward from the surface of the ring for opening upon engagement by the tire during deflation and for dispensing fluid from the fluid chamber through the passage to the radially outer surface of the ring. The closure may be of a flexible material to withstand impact loads without rupturing during operation with the tire in an inflated condition but having a limited tear strength to rupture and release fluid under circumferential shearing forces during operation with a deflated tire.

3 Claims, 6 Drawing Figures

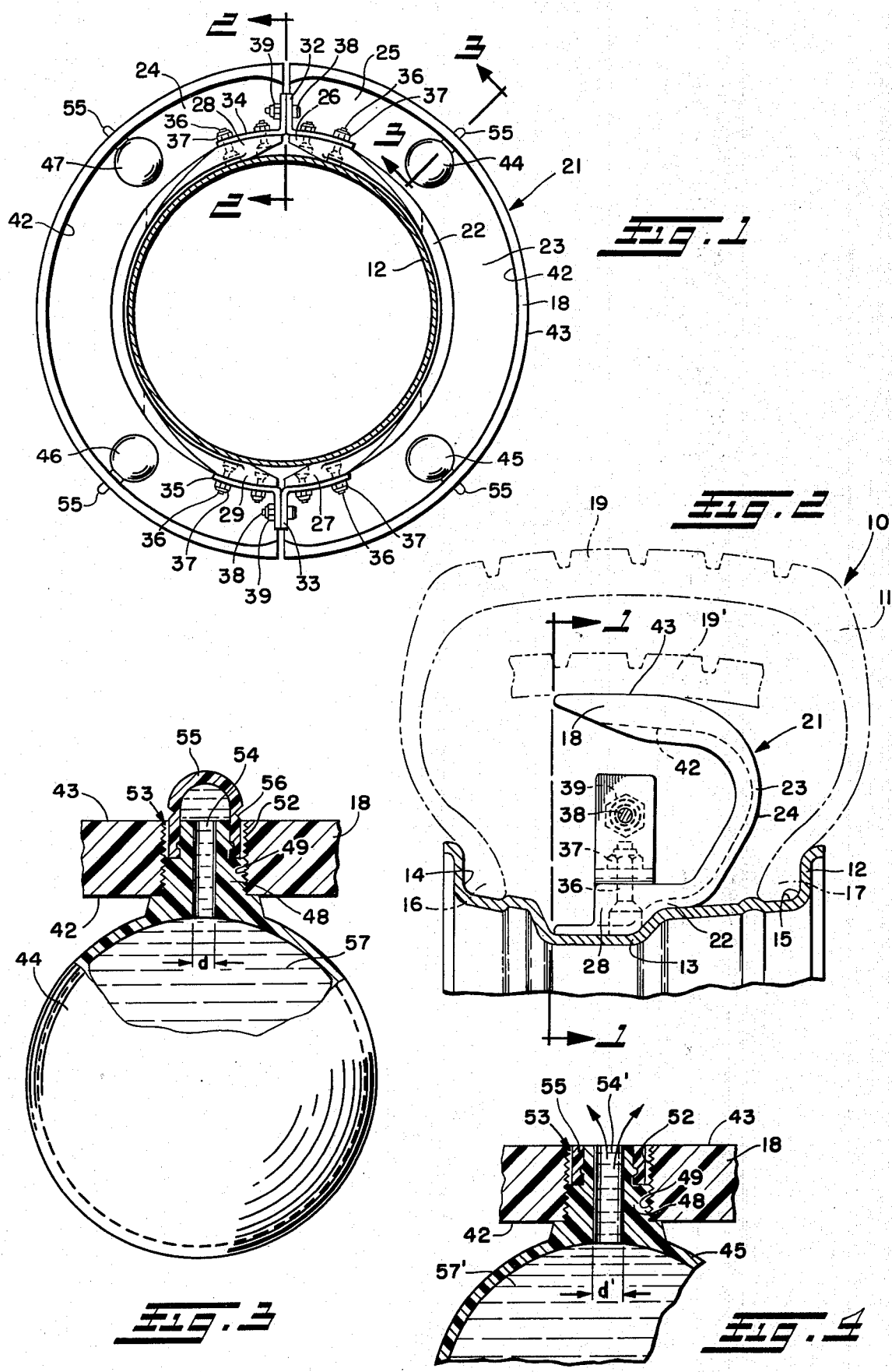

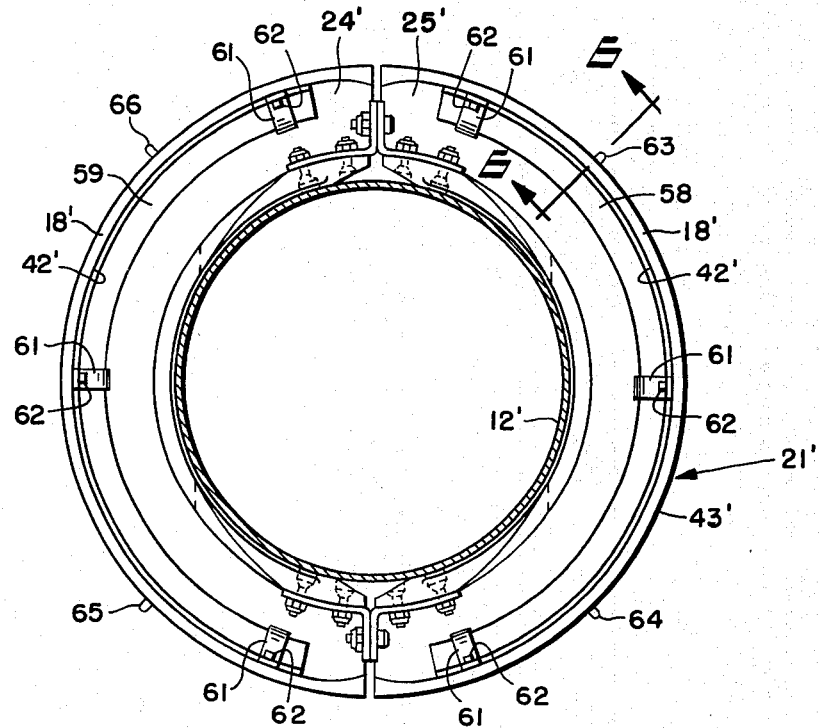
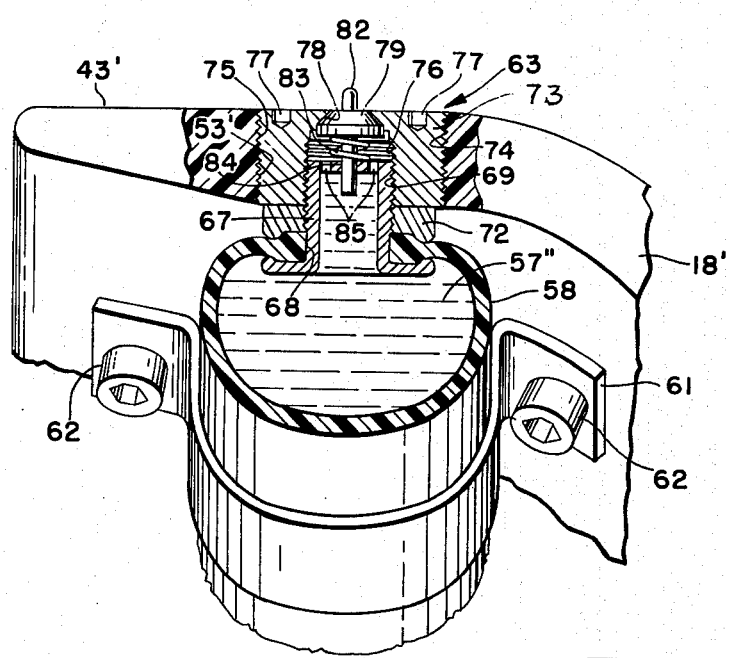

FLUID DISPENSING APPARATUS FOR TIRE WHEEL ASSEMBLY

This invention relates to fluid dispensing apparatus for use with a tire stabilizer ring inside a tire chamber to lubricate and cool the tire when the tire is operated in the deflated condition.

Heretofore various devices have been provided for dispensing fluid inside a tire. These have included locating a fluid chamber outside the tire and rim assembly and manual means for injecting fluid into the tire through a needle piercing a plug in the tire or rim. Also plungers extending radially outward through the rim to a point where they are engageable by the tire in the deflated condition have been used to automatically dispense fluid from the chambers outside the tire. In other devices the fluid containers have been mounted on the rim at the inside of the tire and have release valves extending radially outward for engagement by the tread portion of the tire in the deflated condition.

In most of these devices the support of the tire in the deflated condition has been at the flanges of the rims and no provision has been made for providing a separate fluid supply container inside a tire where a tire stabilizer ring supports the tread portion. Where fluid containers have been located inside the tire there has been a problem holding the containers in position to withstand the centrifugal force generated at high speeds. The fluid containers have also been subject to damage and release of fluid due to excessive deflection of the tread portion during inflated operation. Another problem has been locating the valves or closures at a position where they will function when needed and not dispense fluid at other times which can cause deterioration and failure of the tire at a future time.

An object of this invention is to provide an automatic fluid dispensing apparatus having a fluid chamber located inside the tire for lubricating the tire engaging surface of a stabilizer ring inside the tire.

A further object is to provide for locating the fluid chamber inside the tire so as to resist movement by centrifugal force upon rotation of the tire and wheel.

A still further object is to provide closures for the fluid chamber which will be opened to dispense fluid only upon deflation of the tire and when it is operating in the deflated condition.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

In the annexed drawings:

FIG. 1 is a cross-sectional view taken along the plane of line 1—1 of FIG. 2 showing a side elevation of the fluid dispensing apparatus of this invention.

FIG. 2 is a cross-sectional view taken along the plane of line 2—2 of FIG. 1 showing the contour of the tire in chain-dotted lines in the inflated and deflated condition mounted on the rim.

FIG. 3 is an enlarged sectional view of one fluid container taken along the plane of line 3—3 of FIG. 1 with parts being broken away.

FIG. 4 is a fragmentary view like FIG. 3 of another fluid container showing the closure of FIG. 3 in the open position.

FIG. 5 is a cross-sectional view like FIG. 1 of a modified fluid container and closure.

FIG. 6 is an enlarged sectional view of the fluid container and closure taken along the plane of line 6—6 of FIG. 5.

Referring to the drawings and particularly to FIGS. 1 and 2, a tire wheel assembly 10 is shown in which a tire 11 shown in chain-dotted lines is mounted on a rim 12 which may be of the drop center type. The rim 12 has a drop center portion 13 with bead seat portions 14 and 15 on each side thereof for receiving tire beads 16 and 17 respectively of the tire 11 shown in the inflated condition.

A wheel supported ring member or stabilizer ring 18 is mounted inside the tire 11 at a position spaced radially outward of the rim 12 and radially inward of tread portion 19 of the tire 11 in the inflated condition. The stabilizer ring 18 may be part of an annular member 21 having a rim engaging portion 22 and a substantially radially extending portion or web 23 extending from the rim engaging portion to the stabilizer ring 18. The annular member 21 may be divided into two halves 24 and 25, each being made of a single unitary piece preferably of a material such as fiberglass reinforced plastic. The annular member 21 may however be of a single unitary piece and may be made of other materials if they have the required physical properties especially to provide radial deflection for cushioning the vehicle when the tire is deflated and the tread portion 19 is in engagement with the stabilizer ring 18 as indicated by numeral 19' in FIG. 2. A one piece annular member 21 having a circumferentially continuous stabilizer ring 18 may be of a type adaptable for mounting on a split rim of a vehicle wheel.

In the present embodiment the rim engaging portion 22 is seated in the drop center portion 13 of the rim 12. Ends 26, 27, 28 and 29 of the halves 24 and 25 support brackets 32, 33, 34 and 35 bolted thereon by bolts 36 and nuts 37. Abutting brackets 32, 34 and 33, 35 are fastened together by bolts 38 and nuts 39. The ends 26–29 of the halves 24 and 25 may have an increased thickness to reinforce these members and decrease the deflection thereof.

As shown in FIGS. 1 and 2 the ring 18 has a radially inner surface 42 spaced radially outward from the rim engaging portion 22. The ring 18 also has a radially outer surface 43 which is spaced radially inward of the tread portion 19 when the tire 11 is in the inflated condition. Fluid containers such as hollow spherical balls 44, 45, 46 and 47 are mounted on the ring 18 adjacent the radially inner surface 42 at spaced-apart positions circumferentially around the ring. Each of these balls 44–47 has substantially the same construction and therefore the following description of ball 44 will apply to the other balls also.

The ball 44 may be of a suitable plastic such as polyethylene which may be formed as by blow molding and have a neck 48 with threads 49 for mating engagement with threads 52 in opening 53 of the ring 18. A passage 54 extends from the space within the ball 44 to the radially outer surface 43 of the ring 18 and a closure such as closed end tube 55 of flexible resilient material having a predetermined tear strength is mounted over the end of the neck 48 with the end projecting radially outward from the radially outer surface 43. The tube 55 may have a portion 56 of reduced thickness so that upon engagement of the tread portion 19' with the radially outer surface 43 as during deflation of the tire 11 the resulting shearing action will sever the end from the tube 55 and permit release of fluid 57 in the manner shown by the arrows in FIG. 4. The fluid 57 may be a lubricant including lubricants for rubber such as water and oils as well as anti-freeze solutions such as alcohol and ethylene glycol. The lubricant may also contain a composition capable of sealing a puncture as well as a volatile liquid for partially reinflating the tire through volatization of the lubricant at the temperature generated by running of the tire in a deflated or partially deflated condition.

Each of the balls 44–47 may have a passage 54 having a diameter $d$ for metering the fluid to the radially outer surface 43 of the ring 18 or one or more of the balls such as ball 45 shown in FIG. 4 may have a passage 54' with a diameter $d'$ greater than the diameter $d$ of passage 54 of ball 44. With this construction the fluid 57' from ball 45 will be ejected at a more rapid rate from ball 45 than from ball 44 providing an initial lubrication by a substantially large amount of fluid from ball 45 and then smaller amounts of fluid dispensed over a substantially longer period of time from ball 44.

In operation the balls 44–47 are filled with lubricating fluid 57 and closed by mounting the closed end tube 55 over the end of neck 48 of each of the balls. The balls 44–47 are then mounted in threaded engagement in the openings 53 at spaced-apart positions along the ring 18 of halves 24 and 25 as shown in FIG. 1. Bead 17 of the tire 11 is mounted on the drop center rim 12 after which the two halves 24 and 25 of the annular member 21 are mounted in the drop center portion 13 of the rim and bolted together by bolts 38 and nuts 39 extending through the brackets 32–35. The tire bead 16 is pulled over the rim 12 using the drop center portion 13 and the space next to the rim engaging portion 22 of the annular member 21 to provide the necessary clearance for mounting the bead. The tire 11 is then inflated in a manner well known to the art through a valve (not shown) extending through the rim 12. The inflated tire 11 may be subject to impacts forcing the tread portion 19 momentarily into contact with the flexible tube 55 causing deflection without rupturing of the tube. Upon deflation of the tire 11 the tread portion 19' will engage the radially outer surface 43 of the ring 18 as shown in FIG. 2 and because of the different circumferences of the tread portion 19' and the ring 18 there will be a circumferential shearing action between the tread portion and the radially outer surface of the ring 18. This shearing action working against the end of the tube 55 will cause the end to be severed from the tube and permit ejection of the fluid 57 from the balls 44–47 as shown in FIG. 4 providing lubrication between the surfaces of the tread portion 19' and the radially outer surface 43.

The tire 11 and the annular member 21 may be removed from the rim 12 by reversing the installation procedure outlined above so that the tire may be repaired or replaced. At this time the balls 44–47 may be removed and refilled with fluid 57 and a new closed end tube 55 mounted over the neck 48 of each of the balls. Then it is only necessary to mount the balls 44–47 on the ring 18 at the radially inner surface 42 and the halves 24 and 25 of the annular member 21 are ready to be mounted on the rim 12.

Referring to FIGS. 5 and 6 a modification of the fluid container such as elongated tubes 58 and 59 of plastic or other fluid retaining material are shown mounted on the radially inner surfaces 42' of the ring 18' by straps 61 fastened to the ring 18' by screws 62. The ends of the tubes 58 and 59 are closed to retain the fluid within the tubes and valves 63, 64, 65 and 66 are mounted on the tubes 58 and 59 at spaced-apart positions for ejecting the fluid 57'' from the tubes. The valves 63–66 are identical and therefore the following description of vlave 63 will apply to all of the valves.

A flanged sleeve 67 extends outwardly through an opening 68 in the tube 58 with the flange on the inside of the tube. The sleeve 67 has threads 69 for threaded engagement with collar 72 for clamping the wall of tube 58 between the collar and the flange of the flange sleeve 67. A cylindrical valve member 73 has threads 74 for threaded engagement with threads 75 in an opening 53' in the ring 18'. The cylindrical valve member 73 also has threads 76 on the inner surface for threaded engagement with the threads 69 of the sleeve 67. Sockets 77 are provided in the end surface of the cylindrical valve member 73 for engagement by a spanner wrench for turning the cylindrical valve member in the opening 53' and over the threaded flange sleeve 67. A valve seat 78 is provided in the radially outer surface of the cylindrical valve member 73 for receiving a conical valve member 79 mounted on a pin 82 extending radially inward into the sleeve 67 and radially outward beyond the radially outer surface 43' of the ring 18'. A spring 83 may be interposed between the conical valve member 79 and a cap 84 on the end of the flanged sleeve 67 which has orifices 85 through which the fluid 57'' may flow.

In operation of this modification the tubes 58 and 59 are filled with fluid 57'' after mounting on the halves 24' and 25' of the annular member 21' and then filled with fluid by depressing the valve seat 78 and injecting the fluid into the space within the tubes. The spring 83 will return the conical valve member 79 to a seated position in the valve seat 78 to retain the fluid 57'' in the tubes 58 and 59. The halves 24' and 25' of the annular member 21' may then be mounted on the rim 12' with the tire in a manner similar to that described above for the embodiment of FIGS. 1–4.

When the tire is deflated the tread portion 19 (not shown) will take the position shown in FIG. 2 with the tread portion 19' in engagement with the radially outer surface 43' of the ring 18' and the pin 82 will be depressed causing the conical valve member 79 to move radially inward away from the valve seat 78 and permit ejection of the fluid 57'' onto the radially outer surface 43' of the stabilizer ring 18'. In the event the fluid 57'' contains material for closing a puncture in the tire and also material which will volatize to reinflate the tire the tread portion 19' of the tire 11 may again be partially inflated and moved out of engagement with the pin 82 whereupon no additional fluid 57'' will be ejected into the tire. Even in the case where the tire is punctured there will be engagement and disengagement of the tread portion 19' with the radially outer surface 43' of the ring 18' as the wheel revolves and different portions of the tire are pressed against the ring 18'. It will therefore be evident that only when the tread portion 19' is pressing against the pin 82 will the fluid 57'' be ejected from the tubes 58 and 59.

As described hereinabove for the embodiment of FIGS. 1–4 the halves 24' and 25' of the annular member 21' may be removed with the tire 11' from the rim 12' when the tire is repaired or replaced. At that time the tubes 58 and 59 may be refilled with fluid 57'' and the halves of the annular member reinstalled with the repaired tire or replacement tire.

While certain representative embodiments and details have been shown for the purpose of illustrating the invention it will be apparent to those skilled in the art that various changes and other modifications may be made therein without departing from the invention.

What is claimed is:

1. A fluid dispensing apparatus for a tire wheel assembly having a wheel supported tire stabilizer member inside the tire with a radially outer surface spaced radially inward of the tread portion of the tire in an inflated condition comprising a fluid container, an opening in said stabilizer member, a fluid conducting member disposed in said opening and extending from said fluid container to said radially outer surface of said stabilizer member, said fluid conducting member including a tube of flexible resilient material having a closed end projecting radially outward from said radially outer surface, said closed end having a resilience and flexibility to withstand impact loads without rupturing during operation with the tire in the inflated condition and a predetermined tear strength to rupture and release fluid only upon engagement of said tread portion with said radially outer surface of said stabilizer member producing relative circumferential shearing action between said tread portion and said radially outer surface against said closed end of said tube during operation with the tire in the deflated condition.

2. A fluid dispensing apparatus for a tire wheel assembly having a wheel supported ring member inside the tire with a radially outer surface spaced radially inward of the tread portion of the tire in the inflated condition for supporting the tire in a deflated condition and with a radially inner surface spaced radially outward of the rim of the wheel comprising a fluid container located inside and adjacent said radially inner surface of said ring member, a tube extending from said fluid container to said radially outer surface of said ring member, a closed end of said tube projecting radially outward from said radially outer surface of said ring member, said closed end of said tube being of a material having a flexibility and resilience to withstand impact loads without rupture during normal inflated operation of the tire for containing the fluid under normal inflated operating conditions of the tire and having a predetermined tear strength for tearing to release the fluid only upon engagement of said tread portion with said radially outer portion of said ring member producing relative circumferential shearing action between said tread portion and said radially outer surface against said closed end of said tube during operation in a deflated condition whereby fluid in said fluid container is dispensed through said passage to said radially outer surface of said ring member.

3. A fluid dispensing apparatus for a tire wheel assembly having a wheel supported ring member inside the tire with a radially outer surface spaced radially inward of the tread portion of the tire in the inflated condition for supporting the tire in a deflated condition and with a radially inner surface spaced radially outward of the rim of the wheel comprising a first fluid container located adjacent said radially inner surface of said ring member, a first opening in said ring member providing a first passage from said fluid container to said radially outer surface of said ring member, a first closure for said passage and a first closure actuating means for said first passage extending radially outward from said radially outer surface of said ring member for actuation upon engagement by the tread portion of the tire during deflation, and said ring member having a second opening spaced from said first opening, a second fluid container connected to said ring member at said second opening, a second passage from said second fluid container to said radially outer surface of said ring member, a second closure actuating means for said second passage extending radially outward from said radially outer surface for actuation upon engagement by the tread portion of the tire during deflation, at least one portion of said second passage having a diameter greater than the diameter of at least one portion of said first passage for dispensing fluid from said second fluid container at a greater rate than fluid is dispensed from said first fluid container whereby a substantially large amount of fluid is dispensed initially from both containers and thereafter smaller amounts are dispensed from said first container over a substantially long period of time to said radially outer surface of said ring member.

\* \* \* \* \*